United States Patent [19]

Kawaura et al.

[11] Patent Number: 4,477,061
[45] Date of Patent: Oct. 16, 1984

[54] STRUT TYPE SUSPENSION

[75] Inventors: Takayoshi Kawaura; Hiroyasu Kan, both of Yokohama; Yuji Kyoi, Chiba, all of Japan

[73] Assignee: Nissan Motor Company, Limited, Yokohama, Japan

[21] Appl. No.: 376,155

[22] Filed: May 10, 1982

[30] Foreign Application Priority Data

May 15, 1981 [JP] Japan .................. 56-72169

[51] Int. Cl.³ .................. F16F 9/54; B60G 11/54
[52] U.S. Cl. .................. 267/8 R; 188/321.11; 267/33; 267/152; 280/668
[58] Field of Search .................. 267/8 R, 8 B, 33, 34, 267/63 R, 81, 140.1, 141, 141.2, 141.4, 152, 153, 8 C, 8 D, 8 A, 9 R, 9 B, 9 A, 9 C, 63 A; 188/284, 321.11, 322.22; 280/667, 668, 671

[56] References Cited

U.S. PATENT DOCUMENTS

| 853,548 | 5/1907 | Herz | 267/63 R |
| 3,584,856 | 6/1971 | Desbois | 267/34 |
| 4,175,771 | 11/1979 | Muzechuk et al. | 267/8 R |
| 4,248,454 | 2/1981 | Cotter et al. | 280/668 |
| 4,260,176 | 4/1981 | Pacis et al. | 280/668 |
| 4,260,177 | 4/1981 | Pflughaupt et al. | 267/33 |

FOREIGN PATENT DOCUMENTS

| 65235 | 11/1982 | European Pat. Off. | 267/33 |
| 1116261 | 1/1964 | Fed. Rep. of Germany . | |
| 1195180 | 6/1965 | Fed. Rep. of Germany . | |
| 2268659 | 11/1975 | France . | |
| 51-60022 | 5/1976 | Japan . | |
| 1022603 | 3/1966 | United Kingdom . | |
| 2050557 | 1/1981 | United Kingdom | 267/8 R |

Primary Examiner—Douglas C. Butler
Assistant Examiner—R. R. Diefendorf
Attorney, Agent, or Firm—Thompson, Birch, Gauthier & Samuels

[57] ABSTRACT

A MacPherson strut type suspension including a shock absorber operatively disposed between vehicle wheels and a vehicle body of a motor vehicle, the shock absorber having a piston rod; a coil spring disposed in association with the shock absorber to elastically support the vehicle body; a core member secured to an end of the piston rod of the shock absorber; an insulator rubber securely connected between the core member and the vehicle body; and a stop device for restricting the movement of the core member in the axial direction of the piston rod of the shock absorber when the axial movement of the piston rod exceeds a predetermined distance, thereby effectively damping high and low frequency vibrations applied to the suspension while prolonging the life of the insulator rubber.

2 Claims, 4 Drawing Figures

STRUT TYPE SUSPENSION

BACKGROUND OF THE INVENTION

1. Field of the Invention

This invention relates generally to MacPherson strut type suspension using a strut consisting of a shock absorber and a coil spring, and more particularly to a strut mount insulator through which the strut is mounted on a vehicle body.

2. Description of the Prior Art

Strut type suspensions are in general so arranged that at one end of the strut a shock absorber cylinder is mounted to move with the vehicle wheel, and at the other end of the strut the shock absorber piston rod is connected to the vehicle body, thereby suspending the vehicle body, engine and power train above the wheels. The strut is installed to the vehicle body through an insulator mainly including an insulator rubber in order to prevent the vibration from the wheels from being transmitted to the vehicle body.

A coil spring of the strut is usually disposed between an upper spring seat secured to a strut outer cylinder and a lower spring seat supported through the insulator rubber on the vehicle body, so that the spring action of the coil spring is effected between the strut outer cylinder and the piston rod. Accordingly, the coil spring is secured at its upper end to the vehicle body through the upper spring seat and the insulator rubber, and therefore a high unsprung weight is applied to the insulator rubber. As a result, in the case where the elastic modulus of the insulator rubber is relatively low, the insulator rubber unavoidably deforms to an appreciable extent under a relatively strong external force due to the extension and contraction of the coil spring which supports the vehicle body weight, i.e., due to the vertical movement of the wheels. This not only requires a large space for the moving stroke of the suspension but also lowers the strength of the insulator rubber, thereby degrading the durability thereof. On the contrary, if the elastic modulus of the insulator rubber is increased, the insulator rubber cannot effectively absorb the high frequency vibration which is transmitted thereto from the wheels through the shock absorber piston rod to the vehicle body, which high frequency vibration is mainly due to so-called stick phenomena or stationary relationship between the piston rod and the cylinder of the shock absorber. Such high frequency vibration is transmitted to the vehicle body, thus emitting noise. In this regard, the thus arranged conventional suspension cannot meet the above-mentioned conflicting requirements, and consequently the elastic modulus of the insulator rubber is set unavoidable at a compromise value, taking the above conflicting requirements into consideration.

In view of the above, it is the object of this invention to overcome the above-discussed drawbacks encountered in the conventional strut type suspension.

BRIEF SUMMARY OF THE INVENTION

In accordance with the present invention, a MacPherson strut type suspension is composed of a shock absorber operatively disposed between a vehicle wheel and a vehicle body of a motor vehicle, the shock absorber having a piston rod. A coil spring is disposed in connection with the shock absorber to elastically support the vehicle body. The piston rod is provided at its one end with a core member. An insulator rubber is securely connected between the core member and the vehicle body. Additionally, the suspension is provided with a device for restricting the movement of the core member in the axial direction of the piston rod of the shock absorber when the axial movement of the piston rod exceeds a predetermined distance. With this arrangement, relatively low and high frequency vibrations applied from the vehicle wheels to the suspension can be effectively absorbed while prolonging the life of the insulator rubber.

BRIEF DESCRIPTION OF THE DRAWINGS

The features and advantages of the suspension according to the present invention will be more clearly appreciated from the following description taken in conjunction with the accompanying drawings in which like reference numerals designate like parts and elements, and in which.

DETAILED DESCRIPTION OF THE INVENTION

Figure 1:
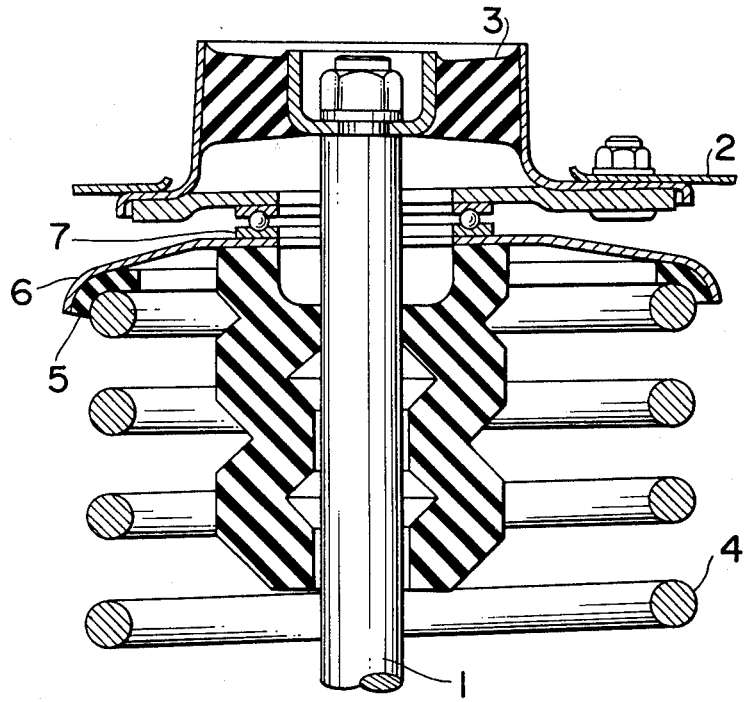
FIG. 1 is a cross-sectional view of an essential part of a conventional MacPherson strut type suspension.

To facilitate the present invention, a brief reference will be made to a conventional strut type suspension depicted in FIG. 1. In the conventional strut type suspension shown in FIG. 1, vertical external force of high frequency vibration, transmitted from vehicle wheels through a shock absorber piston rod 1 to a vehicle body 2, is absorbed by an insulator rubber 3. On the contrary, relatively large vertical external force of low frequency, transmitted from the wheels through the coil spring 4 to the vehicle body 2, is absorbed by an elastic member 5 interposed between the coil spring 4 and an upper spring seat 6, without depending upon the vibration absorbing action of the insulator rubber 3, by virtue of an arrangement in which the upper spring seat 6 is installed through a bearing 7 to the vehicle body 2.

However, this conventional suspension has encountered the following shortcomings. The insulator rubber 3 is supplied with a relatively high vibration amplitude external force when the wheels abruptly move upward and downward with high amplitude, in addition to the above-mentioned high frequency vibration external force. Accordingly, if the elastic modulus of the insulator rubber 3 is too low, the insulator rubber largely deforms thereby deteriorating its durability, while not generating much vibration-damping force thereby degrading its vibration-suppression effect. In this regard, the elasticity variation (elastic modulus) of the insulator rubber 3 must be increased to some extent, for example, as indicated by α in FIG. 2. As a result, the insulator rubber cannot sufficiently absorb high frequency vibration generated within a region where the displacement of the piston rod 1 is relatively small, and therefore it is impossible to expect a desirable vibration-suppression effect.

Figures 3, 4:
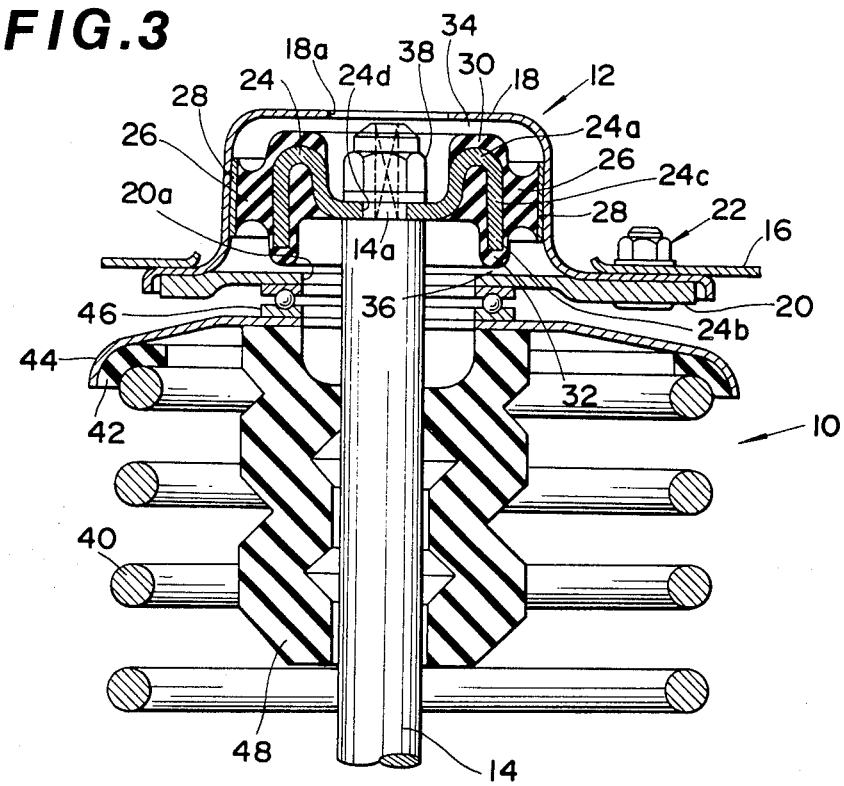
FIG. 3 is a cross-sectional view of an essential part of a preferred embodiment of a MacPherson strut type suspension in accordance with the present invention.
FIG. 4 is a cross-sectional view of an essential part of a modified example of the suspension according to the present invention.

In view of the above description of the conventional strut type suspension, reference is now made to FIGS. 3 and 4, more particularly to FIG. 3 wherein a preferred embodiment of a MacPherson strut type suspension of the present invention is illustrated by the reference numeral 10. The suspension 10 comprises an insulator or insulator assembly 12 through which a piston rod 14 forming part of a shock absorber is connected to a vehicle body 16 in an insulating manner. The shock absorber includes, as usual, a cylinder (not shown) into which the piston rod 14 is movably disposed, the cylinder being connected to move with the vehicle wheels (not shown).

The insulator assembly 12 includes a casting 18 and a cover 20 which are both secured to the vehicle body 16 by bolt-and-nut connection 22. A rigid core member 24 is movably disposed within the casing 18 and is formed with annular upper and lower stop sections 24a, 24b which are spaced apart generally in the axial direction of the core member 24. The core member 24 is further formed with a cylindrical section 24c which is located to integrally connect the upper and lower stop sections 24a, 24b. The core member 24 is connected at its cylindrical section 24c with a cylindrical member 28 through an insulator rubber 26 which attached to the core member 24 and the cylindrical member 28 by adhesion due to vulcanization. The cylindrical member 28 is press-fitted into the casing 18 and is rigidly secured to the inner wall surface of the casing 18.

The upper and lower stop sections 24a, 24b of the core member 24 are respectively provided with annular upper and lower elastic or elastomeric members 30 and 32 which are attached to the upper and lower stop sections 24a, 24b by adhesion due to vulcanization. In this instance, these elastic members 30, 32 are integral with the insulator rubber 26. The elastic members 30, 32 are located to be opposite to the casing 18 inner wall surface and the cover 20 inner wall surface, respectively. The core member 24 is so located that an upper clearance 34 is formed between the upper elastic member 30 and the inner wall surface of the casing 18, while a lower clearance 36 is formed between the lower elastic member 32 and the inner wall surface of the cover 20. It will be understood that the upper and lower elastic members 30, 32 may be attached to the inner wall surfaces of the casing 18 and the cover 20, respectively, instead of to the core member 24.

The piston rod 14 is located to pass through a central opening 20a of the cover 20 and is formed at an upper end with a slender tip section 14a whose cross-section is non-circular. The non-circular tip section 14a is inserted into a central opening 24d of the core member 24, which central opening has a non-circular cross-section corresponding to that of the tip section 14a. The tip section 14a of the piston rod 14 is secured to the core member 24 by installing a nut 38 so that the treated sections of the piston rod tip section 14a and the nut 38 engage with other. The tightening of the nut 38 is carried out with a socket wrench (not shown) inserted into the casing 18 through a central opening 18a of the casing 18.

A coil spring 40 is disposed around the shock absorber and is seated at its lower end section on a lower spring seat (not shown) which is secured to a strut outer cylinder (not shown) in which the shock absorber cylinder is disposed. As shown, the upper end section of the coil spring 40 is seated through an annular elastic or elastomeric member 42 on an upper spring seat 44. A bearing 46 is disposed between the upper spring seat 44 and the cover 20 of the insulator assembly 12, so that the upper spring seat 44 is supported rotatably relative to the vehicle body 16.

A bumper rubber 48 secured to the upper spring seat 44 is disposed around the piston rod 14 and extends downward along the axis of piston rod 14. This bumper rubber 48 serves to receive under damping action an end surface of the shock absorber cylinder from which the piston rod 14 projects, when the shock absorber cylinder ascends to a level in the vicinity of an upper limit position thereof under the upward movement of the vehicle wheels.

In operation of the thus arranged suspension, a relatively large vertical external force, transmitted from the vehicle wheels through the coil spring 40 or the bumper rubber 48, acts on the elastic member 42 to elastically deform it without involving the insulator rubber 26, and thereafter the force is transmitted to the vehicle body 16 via the upper spring seat 44, the bearing 46 and the insulator assembly cover 20. Thus, the shock due to such vertical external force is absorbed by the elastic deformation of the elastic member 42.

Vertical external force, transmitted from the vehicle wheels through the pisotn rod 14, acts on the core member 24 to elastically deform the insulator rubber 26 when the external force is of high frequency vibration and the vibration amplitude is low. The external force is then transmitted through the cylindrical member 28 and the insulator assembly casing 18 to the vehicle body 16. It is to be noted that the elastic modulus of the insulator rubber 26 is set as low as possible as indicated by $\beta$-$\gamma$ in FIG. 2, by which the high frequency vibration is certainly absorbed by the deformation of the insulator rubber 26 to improve vibration suppression effect, thus effectively preventing the generation of noise due to the high frequency vibration.

Figure 2:
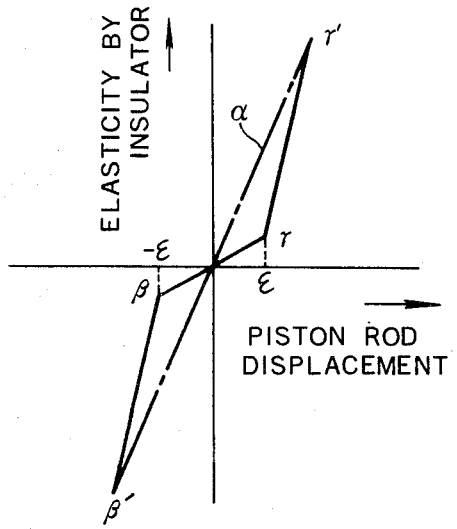
FIG. 2 is a graph showing the elasticity characteristics of an insulator assembly of the present invention in comparison with that of the conventional suspension.

When the vertical external force has a high vibration amplitude, the external force largely deforms elastically the insulator rubber 26 since the elastic modulus of the insulator rubber 26 is set lower as mentioned above. Then, the upper and lower stop sections 24a, 24b of the core member 24 strike against the insulator assembly casing and cover 18, 20, thereby elastically deforming or compressing the elastic members 30, 32. As a result, when the external force produces a vertical displacement of the piston rod 14 of not less than $\pm\epsilon$ as indicated in FIG. 2, is applied to the suspension 10, the compression reaction of the elastic member 30 or 32 is added to the elasticity of the insulator rubber 26, so that the elasticity or elastic modulus exhibited by the insulator assembly 12 of the present invention is enlarged as indicated by $\gamma$-$\gamma'$ or $\beta$-$\beta'$ in FIG. 2.

As discussed above, although the elastic modulus of the insulator rubber 26 is lowered for the purpose of improving the vibration suppression effect as mentioned above, the insulator rubber 26 is prevented from being excessively deformed when being acted upon by an external force having a high amplitude vibration applied through the piston rod 14. Accordingly, the insulator assembly 12, as a whole, exhibits the damping effect on such an external force, thereby sufficiently improving the vibration suppression effect while prolonging the life of the insulator rubber 26. Besides, in this instance, the insulator rubber 26 is secured to the piston rod 14 and the insulator assembly casing 18, and accordingly the insulator rubber 26 is prevented from excessive wear. In this regard, although the elastic modulus of the insulator rubber 26 is set lower, the insulator rubber makes its compressive deformation upon receiving lateral input force, and therefore good drivability is maintained.

While the insulator rubber 26 has been shown and described to be secured through the cylindrical member 28 to the insulator assembly casing 18, it will be appreciated that the insulator rubber 26 may be directly secured at its outer surface to the inside wall surface of the insulator assembly casing 18, as shown in FIG. 4, by means of so-called post-bonding after assembly. Additionally, the elasticity variation characteristic on piston rod displacement of the insulator assembly 12 is not limited to that shown in FIG. 2. It will be understood that the elasticity variation characteristic of the insulator assembly 12 can be varied by varying the distance of the clearances 34, 36, the material and the shape of the insulator rubber 26 and elastic stopper members 30, 32 in order that they match various requirements.

As appreciated from the above, in the MacPherson strut type suspension, the external force from the piston rod is absorbed by the deformation of the insulator rubber secured to the vehicle body and the core member fixed on the piston rod of the shock absorber when the external force is low in vibration amplitude; whereas the external force from the piston rod is regulated under the moving stop action of the core member stop sections in co-operation with insulator assembly casing and cover when the external force is high in vibration amplitude. Accordingly, the suspension according to the present invention can meet the difficult requirement of suppressing both high and low amplitude vibrations by suitably selecting the elastic modulus of the insulator rubber. Furthermore, the insulator rubber is prevented from excessive deformation thereby improving the durability thereof, and it is sufficient that the space for the operational stroke of the suspension is quite small thereby providing an advantage in design. Moreover, since the insulator rubber is fixed to the vehicle body and the piston rod, it is prevented from undue wear. Additionally, the insulator rubber is high in its lateral direction rigidity, and therefore good drivability is obtained.

What is claimed is:

1. A MacPherson strut type suspension for a motor vehicle having vehicle wheels and a vehicle body, comprising:
   a shock absorber operatively disposed between the vehicle wheels and the vehicle body, said shock absorber having a piston rod;
   a coil spring disposed in association with said shock absorber to elastically support the vehicle body;
   a core member secured to an end of said piston rod of said shock absorber, said core member including upper and lower stop sections which are spaced from each other generally in the direction of the core member axis, said core member including a cylindrical section integrally connecting said upper and lower stop sections and arranged coaxially with said shock absorber piston rod;
   an insulator rubber securely connected between said core member and the vehicle body, a major portion of said insulator rubber being secured to said core member cylindrical section; and
   stop means for restricting the movement of said core member in the axial direction of said piston rod of said shock absorber when an axial movement of said piston rod exceeds a predetermined distance, said stop means including a cooperating casing and cover defining therebetween a space within which said core member is movably disposed, said casing and cover being rigidly mounted to the vehicle body, said casing having a portion located opposite to and separate from said core member upper stop section, said cover having a portion located opposite to and separate from said core member lower stop section, and upper and lower elastic members secured to said core member upper and lower stop sections, said upper elastic member being so located as to form an upper clearance between it and an inner wall surface of said casing, said lower elastic member being so located as to form a lower clearance between it and an inner wall surface of said cover, said upper and lower elastic members being integral with said insulator rubber.

2. A suspension as claimed in claim 1, further comprising a cylindrical member to which said insulator rubber is secured, said cylindrical member being fixedly connected to the inner wall surface of said casing.

* * * * *

UNITED STATES PATENT AND TRADEMARK OFFICE
CERTIFICATE OF CORRECTION

PATENT NO.   : 4,477,061
DATED        : October 16, 1984
INVENTOR(S)  : Takayoshi Kawaura and Hiroyasu Kan
               and Yuji Kyoi It is certified that error appears in the above-identified patent and that said Letters Patent are hereby corrected as shown below:

On the title page;

After "[73] Assignee: Nissan Motor Co., Ltd., Yokohama, Japan", insert --Kinugawa Rubber Ind. Co., Ltd., Chiba City, Japan--

Signed and Sealed this

Ninth Day of July 1985

[SEAL]

Attest:

DONALD J. QUIGG

Attesting Officer    Acting Commissioner of Patents and Trademarks